US007794859B2

(12) United States Patent
Sakamoto et al.

(10) Patent No.: US 7,794,859 B2
(45) Date of Patent: Sep. 14, 2010

(54) RARE-EARTH MAGNET

(75) Inventors: Takeshi Sakamoto, Tokyo (JP); Nobuya Uchida, Tokyo (JP); Yoshitomo Tanaka, Tokyo (JP); Yasuyuki Nakayama, Tokyo (JP)

(73) Assignee: TDK Corporation, Tokyo (JP)

( * ) Notice: Subject to any disclaimer, the term of this patent is extended or adjusted under 35 U.S.C. 154(b) by 211 days.

(21) Appl. No.: 11/540,723

(22) Filed: Oct. 2, 2006

(65) Prior Publication Data

US 2007/0077454 A1 Apr. 5, 2007

(30) Foreign Application Priority Data

Sep. 30, 2005 (JP) ............................ 2005-286557

(51) Int. Cl.
*B32B 15/04* (2006.01)

(52) U.S. Cl. ................................ 428/693.1; 428/692.1

(58) Field of Classification Search ............... 428/693.1
See application file for complete search history.

(56) References Cited

U.S. PATENT DOCUMENTS 5,314,756 A * 5/1994 Tagaya ....................... 428/546
6,866,765 B2 * 3/2005 Ando et al. ................. 205/291
7,285,338 B2 * 10/2007 Yamashita et al. .......... 428/668

FOREIGN PATENT DOCUMENTS

| | | | |
|---|---|---|---|
| JP | A-59-100286 | | 6/1984 |
| JP | A-07-106109 | | 4/1995 |
| JP | B2-2599753 | | 1/1997 |
| JP | 10021930 A | * | 1/1998 |
| JP | A-2001-152209 | | 6/2001 |
| JP | A-2002-212783 | | 7/2002 |
| JP | A-2003-257768 | | 9/2003 |

* cited by examiner

*Primary Examiner*—Mark Ruthkosky
*Assistant Examiner*—Gary Harris
(74) *Attorney, Agent, or Firm*—Oliff & Berridge, PLC

(57) ABSTRACT

A rare-earth magnet having a protective film for enhancing a corrosion resistance is provided. The protective film is a three-layer film including a first protective layer with a crystalline structure α (for example, a polycrystalline structure), a second protective layer with a crystalline structure β (for example, a columnar-crystalline structure), and a third protective layer with the crystalline structure α from the side near a magnet body. Since the adjoining first and second protective layers have different crystalline structures from each other, and the adjoining second and third protective layers have also different crystalline structures from each other, compactness among the three layers in the protective film may be improved. Therefore, development of a pinhole is restrained, and corrosion of the protective film can be restrained.

5 Claims, 8 Drawing Sheets

RARE-EARTH MAGNET

CROSS REFERENCE TO RELATED APPLICATIONS

The present invention contains subject matter related to Japanese Patent Application JP 2005-286557 filed in the Japan Patent Office on Sep. 30, 2005, the entire contents of which being incorporated herein by reference.

BACKGROUND OF THE INVENTION

1. Field of the Invention

The present invention relates to a rare-earth magnet for which a protective film is provided over the magnet body containing rare earth elements.

2. Description of the Related Art

A well-known exemplary rare-earth magnets includes a Sm—$Co_5$-based, $Sm_2$—$Co_{17}$-based, Sm—Fe—N-based, or R—Fe—B-based magnets (R represents a rare earth element), which are used as a high-performance permanent magnet. Among them, the R—Fe—B-based magnet especially attracts a high attention because it includes as its main rare-earth element Neodymium (Nd), which can be obtained easily and at a comparatively low cost compared with Samarium (Sm), while iron (Fe) is also obtainable at low cost, and further, its magnetic performance is equivalent to or more excellent than that of the Sm—Co-based magnets.

However, since the R—Fe—B-based rare-earth magnet contains as its principal component a rare earth element and iron that are easily oxidizable, its corrosion resistance is comparatively low. Thereby, deterioration, dispersion, etc. of its practical performance have been a problem.

In order to improve the foregoing problem of low corrosion-resistance of such rare-earth magnets, formation of a protective film made of an oxidation-resistant metal etc. on the surface thereof has been proposed. For example, those coated by overlaying two metal-plating layers made of nickel (Ni) is disclosed in Patent Document of JP. Pat. No. 2599753 description, and those coated by overlaying a metal-plating layer made of nickel(Ni)-sulfur(S) alloy subsequent to overlaying a metal-plating layer made of nickel is disclosed in Patent Document of Japanese Laid-Open Patent Publication (Kokai) No. 106109/1995.

SUMMARY OF THE INVENTION

Although it is certain that the foregoing protective films can improve the corrosion resistance characteristics of rare-earth magnets, a further improvement is required because existence of just a few pinholes over the foregoing protective films will cause a corrosion under such a severe atmosphere environment as a chloride or a sulfurous acid gas.

In view of the drawback as described above, it is desirable to provide a rare-earth magnet capable of improving corrosion resistance characteristics.

In accordance with a first aspect of the present invention, there is provided a rare-earth magnet which includes a magnet body containing a rare earth element and a protective film covering the surface of the magnet body, and the protective film includes three or more layers each having a type of crystalline structure, and there exists two or more types of crystalline structures in the protective film in all.

In the rare-earth magnet according to the first aspect of the present invention, since the protective film includes three or more layers each having a type of crystalline structure, and there exists two or more types of crystalline structures in the protective film in all, the compactness of the protective film improves.

In accordance with a second aspect of the present invention, there is provided a rare-earth magnet which includes a magnet body containing a rare earth element and a protective film covering the surface of the magnet body, and the protective film includes: a first protective layer with a polycrystalline structure, adjacent to the magnet body; a second protective layer with a polycrystalline structure, away from the magnet body; and one or more interlayers disposed between the first protective layer and the second protective layer, the interlayers including a third protective layer with a columnar-crystalline structure.

As for the rare-earth magnet according to the second aspect of the present invention, one or more interlayers are disposed between the first protective layer adjacent to the magnet body and the second protective layer away from the magnet body, and the interlayers include a third protective layer with a columnar-crystalline structure. As a result, the crystal grain boundaries between the first protective film and the third protective film, and between the second protective film and the third protective film are involved each other in a comparatively intricate manner.

In the rare-earth magnet in accordance with the first aspect of the present invention, it is preferred that the protective film includes a triple-layer structure, any layer in the triple-layer structure having a type of crystalline structure different from that of adjacent layer thereto.

In the rare-earth magnet in accordance with the second aspect of the present invention, it is preferred that the average crystal grain diameter in the first protective layer and the average crystal grain diameter in the second protective layer are smaller than that in the major-axis direction in the third protective layer. In this case, the protective film may further include a fourth protective layer disposed between the first protective layer and the third protective layer, and the average crystal grain diameter of the fourth protective layer is larger than that of the first protective layer and smaller than that in the major-axis direction in the third protective layer.

Herein, the phrase "the protective film includes three or more layers each having a type of crystalline structure, and there exists two or more types of crystalline structures in the protective film in all", described above for explaining the rare-earth magnet in accordance with the first aspect of the present invention, does not mean that each of the layers has two or more types of crystalline structures but means that one layer has only one type of crystalline structure selected from the two or more types of crystalline structures so that the multilayer film made of three or more layers can consequently have the two or more types of crystalline structures as a whole. The "crystalline structure" represents a structure (crystalline structure) determined based on the shape and particle size (average crystal grain diameter) of a crystalline. Especially, one example of "two or more types of crystalline structures" may include a combination of a polycrystalline structure and a columnar-crystalline structure, and the like. As for the configuration that "any layer in the triple-layer structure having a type of crystalline structure different from that of adjacent layer thereto," in the case where the protective film has four or more layers, it is acceptable that three of the four or more layers have this configuration. Especially in the case where the protective film has four or more layers and there exists several combinations of "three layers" in the protective film, every combination of the "three layers" does not have to have this configuration. What is necessary is at least one of the several combinations of "the three layers" has this configuration. Of course, all the combinations of "the three layers" may have this configuration.

The phrase "the interlayers including a third protective layer with a columnar-crystalline structure" may represent a state where the interlayers include only the third protective layer (the third protective layer may be a monolayer or a multilayer), or represent a state where the interlayers are several layers containing the third protective layer (the third protective layer may be a monolayer or a multilayer). Namely, what is necessary is that the third protective layer is included in the interlayers irrespective of whether the third protective layer itself is a monolayer or a multilayer.

A rare-earth magnet according to the first aspect of the present invention, since a protective film includes three or more layers each having a type of crystalline structure, and there exists two or more types of crystalline structures in the protective film in all, production of a pinhole is restrained and a corrosion of the protective film can be restrained consequently. Therefore, corrosion resistance can be enhanced.

A rare-earth magnet according to the second aspect of the present invention, since a protective film includes: a first protective layer with a polycrystalline structure, adjacent to the magnet body; a second protective layer with a polycrystalline structure, away from the magnet body; and one or more interlayers disposed between the first protective layer and the second protective layer, the interlayers including a third protective layer with a columnar-crystalline structure, corrosion materials applied from the outside can be well prevented from spreading over the grain boundaries, and corrosion resistance can be enhanced consequently.

Other and further objects, features and advantages of the invention will appear more fully from the following description.

BRIEF DESCRITION OF THE DRAWINGS

DETAILED DESCRIPTION OF THE PREFERRED EMBODIMENTS

Embodiments of the present invention will be described in detail hereinbelow with reference to the drawings.

First Embodiment

Figure 1:
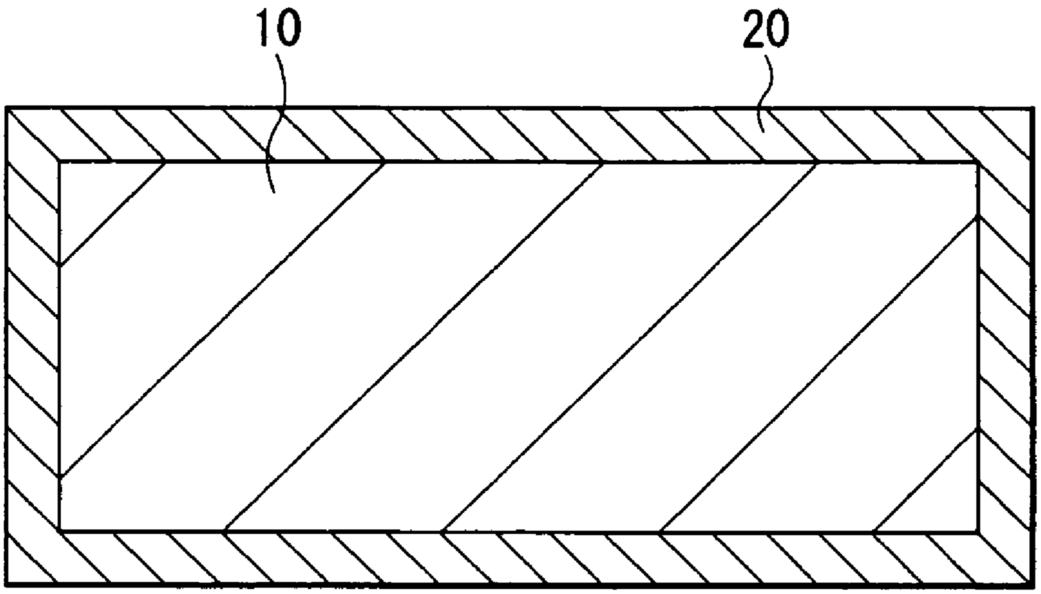
FIG. 1 is a cross-sectional view showing a sectional configuration of a whole rare-earth magnet according to a first embodiment of the present invention.
Figure 2:
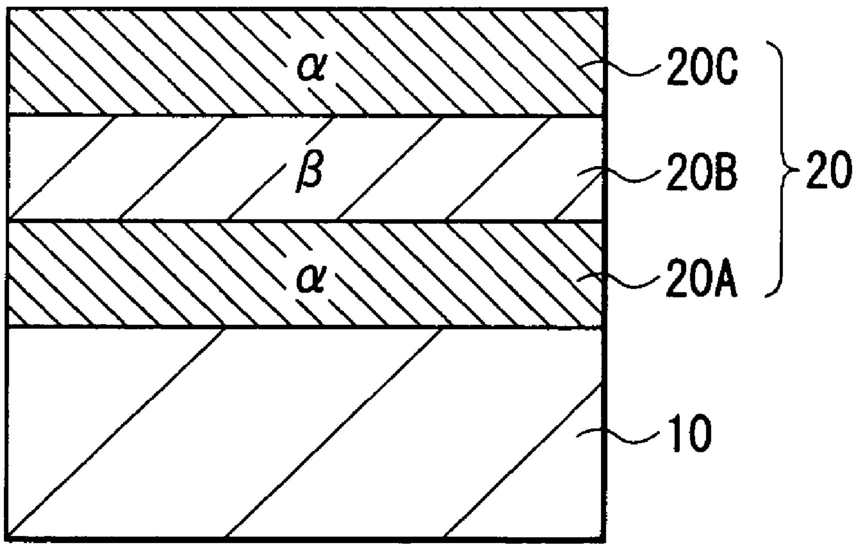
FIG. 2 is a schematical view of the enlarged sectional configuration of a main part of the rare-earth magnet appearing in FIG. 1.

First, a configuration of a rare-earth magnet according to a first embodiment of the present invention will be described with reference to FIGS. 1 and 2. FIGS. 1 and 2 express the configuration of the rare-earth magnet concerning the present embodiment, and the FIG. 1 is a schematical cross-sectional view showing the configuration of the whole rare-earth magnet and FIG. 2 is an enlarged schematical cross-sectional view showing the principal part of the rare-earth magnet appearing in FIG. 1. The rare-earth magnet is provided with a magnet body 10 containing a rare earth element and a protective film 20 covering the magnet body 10 as shown in FIG. 1.

The magnet body 10 is constituted of a permanent magnet containing a transition metal element and a rare earth element. The rare earth element is a general term representing the sixteen elements that belong to the IIIrd group of the long period type periodic table, which consists of: yttrium (Y), and lanthanum (La), cerium (Ce), praseodymium (Pr), neodymium, promethium (Pm), samarium, europium (Eu), gadolinium (Gd), terbium (Tb), dysprosium (Dy), holmium (Ho), erbium (Er), thulium (Tm), ytterbium (Yb) and lutetium (Lu) of lanthanoids.

Examples of a permanent magnet that constitutes the magnet body 10 include what contains one or more sorts of rare earth elements, iron and boron. The magnet body 10 substantially includes a main phase of a crystalline structure of a tetragonal system, a rare earth rich phase and a boron-rich phase. It is preferred that the particle size of the main phase is 100 micrometers or less. The rare earth-rich phase and the boron-rich phase are nonmagnetic phases that exist mainly in the grain boundary of the main phase. The usual percentage (or rate of content) for the nonmagnetic phases is from 0.5 volume percent to 50 volume percent.

It is preferred that examples of the rare earth elements include at least one element selected from the group consisting of neodymium, dysprosium, praseodymium and terbium.

The percentage of the rare earth elements is preferably 8 atom percent to 40 atom percent. If the percentage of the rare earth elements is less than 8 atom percent, the crystalline structure will be made into a cubic system structure like α-iron so that high coercivity (iHc) may be hardly obtainable. On the other hand, if the percentage is more than 40 atom percent, the rare earth-rich nonmagnetic phase will be increased too much so as to lower residual magnetic flux density (Br).

The percentage of iron is preferably 42 atom percent to 90 atom percent. If the percentage of iron is less than 42 atom percent, the residual magnetic flux density will be lowered.

On the other hand, if the percentage is more than 90 atom percent, the coercivity will be reduced.

The percentage of boron is preferably 2 atom percent to 28 atom percent. If the percentage of boron is less than 2 atom percent, the crystalline structure will be made into a rhombohedron structure so that substantial coercivity may be hardly obtainable. On the other hand, if the rate of content percentage is more than 28 atom percent, the boron-rich nonmagnetic phase will be increased too much so as to lower the residual magnetic flux density.

It is to be noted that iron may be partially replaced by cobalt because temperature characteristics can be improved without spoiling magnetic properties in this manner. In this case, it is preferred that the amount of displacement of cobalt is, when expressed with $Fe_{1-x}Co_x$, within a range where x is 0.5 or less in the atomic ratio. It is because magnetic properties will be deteriorated if the amount of displacement is more than that.

Boron may be partially replaced by at least one element selected from the group consisting of carbon (C), phosphorus (P), sulfur and copper. In this manner, productivity can be improved and cost reduction can be attainable. In this case, it is preferred that the percentage for these carbon, phosphorus, sulfur and copper is 4 atom percent or less of the whole. If the percentage is more than that, magnetic properties will be deteriorated.

It is also possible to add one or more elements selected from the group consisting of aluminium (Al), titanium (Ti), vanadium (V), chromium (Cr), manganese (Mn), bismuth (Bi), niobium (Nb), tantalum (Ta), molybdenum (Mo), tungsten (W), antimony (Sb), germanium (germanium), tin (Sn), zirconium (Zr), nickel, silicon (Si), gallium (Ga), copper and hafnium (Hf) in order to improve the coercivity and productivity, and lowering of production cost. In this case, the total additive rate thereof is preferably 10 atom percent or less of the whole because deterioration of magnetic properties will be caused if the total additive rate is higher than that.

In addition, inclusion of inevitable impurities such as oxygen (O), nitrogen (N), carbon or calcium (Ca) is permissible within the range of 3 atom percent or less of the whole.

Examples of permanent magnets that form the magnet body 10 may also include what contains one or more sorts of rare earth elements and cobalt, or what contains one or more sorts of rare earth elements, iron and nitrogen. Specifically, for example, what contains samarium and cobalt such as a Sm—Co5 system, a Sm2-Co17 system etc. (the numeric characters represent an atomic ratio), or what contains neodymium, iron and boron such as a Nd—Fe—B system etc. may be included.

The protective film 20 includes three or more layers each having a type of crystalline structure, and there exists two or more types of crystalline structures in the protective film 20 in all. The "crystalline structure" is a structure (crystalline structure) to be determined based on the shape and particle size (average crystal grain diameter) of the crystalline. The laminated configuration of this protective film 20 can be freely set up, as long as the protective film 20 includes three or more layers each having a type of crystalline structure, and there exists two or more types of crystalline structures in the protective film 20 in all, as described above.

Especially it is preferred that the protective film 20 includes a triple-layer structure, any layer in the triple-layer structure having a type of crystalline structure different from that of adjacent layer thereto. That is to say, in the triple-layer structure, one layer and another layer, which are in contact with (or bound on) each other, have crystalline structures different from each other. Here, as shown in FIG. 2 for example, the protective film 20 is a multilayer film, and there exists two types of crystalline structures α, β in the protective film 20 in all. Specifically, the protective film 20 is a three-layer film in which a protective layer 20A with a crystalline structure α, a protective layer 20B with a crystalline structure β, and a protective layer 20C with the crystalline structure α are layered in this order from the side near the magnet body 10. Here, for example, the crystalline structure α is a polycrystalline (microcrystalline) structure, and the crystalline structure β is a columnar-crystalline structure. These protective layers 20A-20C are formed of some metal plating layer, for example. The metal of the metal plating includes not only a simple substance but also some alloy.

As described above, since the protective film 20 includes three or more layers (the protective layers 20A to 20C) each having a type of crystalline structure, and there exists two or more types of crystalline structures in the protective film 20 in all, there is a tendency that a pinhole can be cancelled more easily in the formation process (plating process) of the protective film 20, than would otherwise be the case. Namely, since a simple pinhole can be filled in through the plating process (during the growth process of the metal-plating layer) because of the multilayered structure of the protective film 20, any pinhole is hardly remained in the protective film 20. However, since a particle size is large in a sintered alloy like the magnet body 10 fabricated via powder metallurgy process, it is sometimes difficult to completely cover the whole grain boundary portion of the magnet body 10 only with one layer of the metal-plating layer (namely, all the pinholes can be hardly filled in). To solve the problem, if the protective film 20 includes three or more layers each having a type of crystalline structure, and there exists two or more types of crystalline structures in the protective film 20 in all, the layers grow to have different crystalline structures from one another. Consequently, it is possible to cover the grain boundary portion of magnet body 10 sufficiently enough (namely, the pinholes are filled in) by the metal-plating layer. The layer with a columnar-crystalline structure (here represents the protective layer 20B) is especially suitable for filling pinholes because it is developed in an electrocrystallization-growth manner so as to avoid creating a crevice.

Especially in this case, if the protective film 20 includes a triple-layer structure, any layer in the triple-layer structure having a type of crystalline structure different from that of adjacent layer thereto as described above, pinholes can be cancelled more easily than would otherwise be the case. From this viewpoint, a desirable laminated configuration of the protective film 20 is the one in which layers with a polycrystallineine (microcrystallineline) structure that have small average crystal grain diameter (the protective layers 20A, 20C) and a layer with a columnar-crystalline structure (the protective layer 20B) are alternately layered, as described above.

In other words, the protective film 20 includes: the protective layer 20A (a 1st protective layer) with a polycrystalline structure, adjacent to the magnet body 10; a second protective layer 20C (a 2nd protective layer) with a polycrystalline structure, away from the magnet body 10; and the protective layer 20B (a 3rd protective layer) with a columnar-crystalline structure, provided as an interlayer between the protective layers 20A and 20C. Here, since only a monolayer protective layer 20B is arranged between the protective layers 20A and 20C as shown in FIG. 2, the protective film 20 is a three-layered film.

The average crystal grain diameter of the protective layers 20A and 20C is smaller than the average crystal grain diameter in the major-axis direction in the protective layer 20B.

Since the protective layer 20A has a microcrystalline structure, the compactness of the interface between the protective film 20 and the magnet body 10 can improve and consequently, the number of pinholes can be decreased. In addition, since the protective layer 20C has a microcrystalline structure, the compactness of the outer surface of the protective film 20 may become also enhanced. As a result, the number of pinholes can be more decreased. The average crystal grain diameter of the protective layer 20A is preferably 0.5 micrometer or less. Similarly, the average crystal grain diameter of the protective layer 20C is preferably 0.5 micrometer or less.

Figure 3:
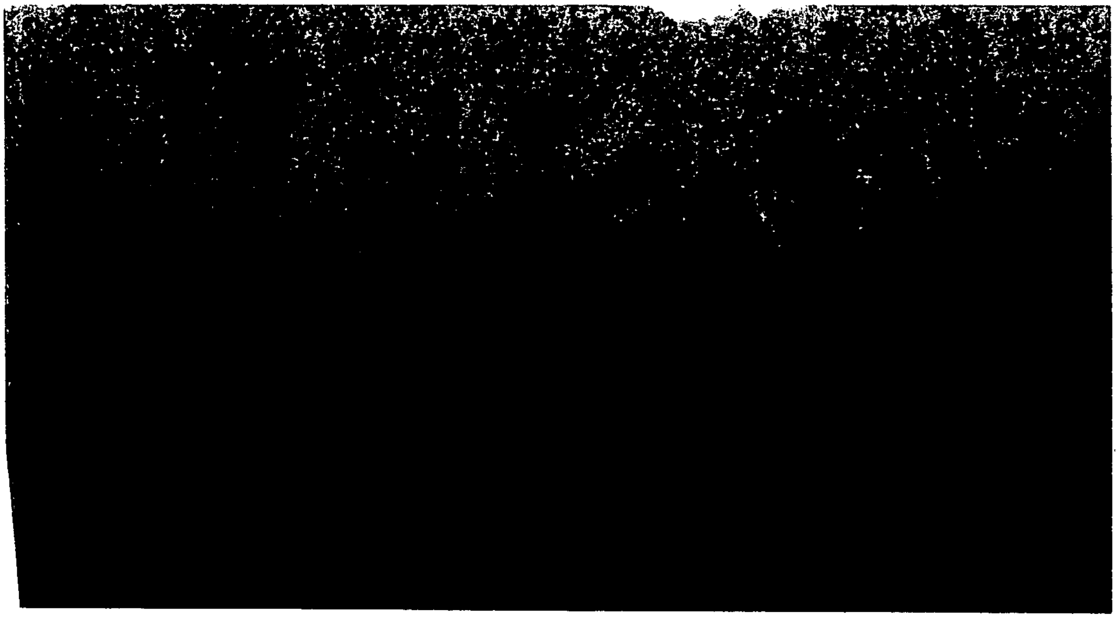
FIG. 3 shows an SIM picture representing the cross sectional structure of the rare-earth magnet appearing in FIG. 2.
Figure 4:
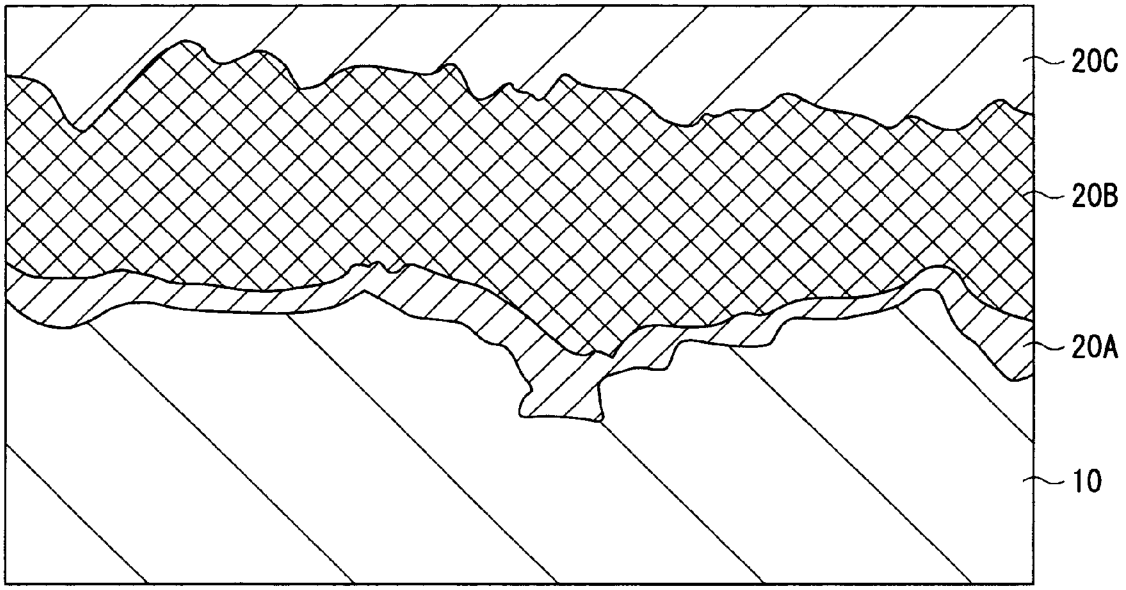
FIG. 4 is a schematical view showing the SIM picture appearing in FIG. 3.

Since the protective layer 20B has a columnar-crystalline structure as described above, higher corrosion resistance can be acquired. Here, the columnar-crystalline structure represents a state where crystallines, whose particle sizes in one direction are larger than those in the direction orthogonal to the one direction, are arranged with a certain orientation; it is not always necessary for the columnar-crystalline structure that crystallines should be altogether arranged in a uniform direction. On the contrary, it is more desirable for the columnar crystalline to grow in a radial pattern, as shown in FIG. 3. FIG. 3 shows a SIM (Scanning Ion Microscopy) image of a rare-earth magnet by means of FIB (Focused Ion Beam). FIG. 4 is a schematic view of the SIM picture appearing in FIG. 3, in which the portion where shading is applied corresponds to the protective layer 20B. With such a structure, boundaries of the crystal grains are involved rather intricately with each other so that spread of corrosion materials applied from outside can be interrupted at the grain boundaries. The size of the columnar crystal in the protective layer 20B is preferably within a range that the average crystal grain diameter in the major-axis direction is 2 micrometers or more, and the average crystal grain diameters in the minor-axis direction is 1 micrometer or less, more preferably 0.5 micrometer or less. Hereinafter, it is assumed that when a simple term of "average crystal grain diameter" is used to explain about the protective layer 20B with a columnar-crystalline structure, the term represents the average crystal grain. diameter in the major-axis direction.

It is preferred that the protective layers 20A to 20C are made of nickel or nickel alloy for example because high corrosion resistance can be acquired. However constituent materials to form the foregoing protective layers 20A to 20C are not limited to nickel or nickel alloy but copper, copper alloy, tin or tin alloy may be used.

The rare-earth magnet can be manufactured by, for example, forming the magnet body 10, and then layering the protective layers 20A-20C in this order to form the protective film 20 over the magnet body 10.

The magnet body 10 is preferably formed with a sintering process as follows for example. First, an alloy of a desired composition is cast to produce an ingot. Subsequently, the obtained ingot is roughly ground to a particle size of about 10 micrometers to 800 micrometers using a stamp mill etc., then pulverized further to powders of a particle size of about 0.5 micrometer to 5 micrometers using a ball mill etc. Subsequently, the obtained powder is subject to a forming process preferably in a magnetic field. In this case, the magnetic field strength is preferably $10000*10^3/(4\pi)$ A/m (=10 kOe) or more, and the forming pressure is preferably of the order of 1 $Mg/cm^2$ to 5 $Mg/cm^2$.

Subsequently, the obtained form (i.e. compact) is sintered at 1000 to 1200 degrees Celsius for 0.5 to 24 hours, and then quenched. The sintering atmosphere is preferably inert gas atmospheres including an argon (Ar) gas, or a vacuum. Thereafter, it is preferred to perform an aging treatment in the inert gas atmosphere at 500 to 900 degrees Celsius for one to five hours. The aging treatment may be repeated several times.

When using two or more sorts of rare earth elements, mixtures such as a misch metal may be used as a raw material. The magnet body 10 may be manufactured with a method other than the sintering process, including what is called a quenching method that is typically used at the time of fabricating a bulk magnet.

The protective film 20 (the protective layers 20A to 20C) is preferably formed by electroplating. A plating bath may be chosen in view of a sort of metal-plating layer to be formed. In this case, the average crystal grain diameters and the shapes of the crystalof the protective layers 20A to 20C are controlled by adjusting a nature of the plating bath or a current density at the time of metal plating treatment. For example, the protective layer 20A can be made into a microcrystalline structure by setting the current density within a range of 0.3 $A/dm^2$ to 1 $A/dm^2$ by applying an overvoltage. The protective layer 20B can be made into a columnar-crystalline structure by setting the current density within a range of 0.01 $A/dm^2$ to 0.3 $A/dm^2$ while adding a suitable brightener for example. The protective layer 20C can be made into a microcrystalline structure by setting the current density within a range of 0.01 $A/dm^2$ to 0.3 $A/dm^2$ while adding a suitable brightener for example.

As the above-mentioned brightener for metal plating, it is possible to use a semi-gloss additive or a gloss additive as necessary for example. Exemplary semi-gloss additives include an organic substance which does not contain sulfur, such as butynediol, coumarin, a propargyl alcohol, formalin formaldehyde, and the like. As for the gloss additive, exemplary primary brighteners include saccharin, 1,5-naphthalenedisulfonic acid sodium, 1,3,6-naphthalenetrisulfonic acid sodium, para-toluenesulfonamide, and the like. Exemplary secondary brighteners include coumarin, 2-butyne 1,4-diol, ethylene cyanohydrin, propargyl alcohol, formaldehyde, thiourea, quinoline, or pyridine, and the like.

In this manner, values of the average crystal grain diameter of the protective layers 20A to 20C are controllable if the above-mentioned metal-plating conditions (mainly the current density) and usage of the plating bath (mainly the sort of brighteners) are well satisfied. Generally, the average crystal grain diameter of a metal-plating layer tends to become larger in the order as follows: the average crystal grain diameter of a metal-plating layer made by bright electroplating<the average crystal grain diameter of a metal-plating layer made by alloy plating<the average crystal grain diameter of a metal-plating layer made by pulse metal plating<the average crystal grain diameter of a metal-plating layer made by semi-gloss metal plating. If the foregoing sorts of metal-plating layers are used in combination by controlling their average crystal grain diameters within a range of 0.01-1 micrometer, the protective film 20 (the protective layers 20A-20C) with a desirable structure is obtainable.

It is to be noted that some pretreatment may be carried out before forming the protective film 20. Examples of pretreatment include degreasing by using an alkali, degreasing by using an organic solvent, and an activation through an acid treatment to be performed subsequently, and the like.

As described above, according to the present embodiment, the protective film 20 includes three or more layers (the protective layers 20A-20C) each having a type of crystalline structure, and there exists two or more types of crystalline structures α and β in the protective film 20 in all. As a result, compactness of the protective film 20 is improved. Specifically, the compactness of the interface of the magnet body 10 and the protective film 20 as well as the compactness of the outer surface of the protective film 20 can be improved. In accordance with that, the development of a pinhole is restrained so as to restrain the corrosion of the protective film 20. In addition, the protective film 20 includes: the protective layer 20A with a polycrystalline structure, adjacent to the magnet body 10; the protective layer 20C with a polycrystalline structure, away from the magnet body 10; and the protective layer 20B with a columnar-crystalline structure disposed as an interlayer between the protective layers 20A and 20B. As a result, the crystal grain boundaries between the protective layer 20A and the protective layer 20B, and between the protective layer 20B and the protective layer 20C are involved each other in a comparatively intricate manner. Thereby, corrosion materials applied from the outside can be well prevented from spreading over the grain boundaries, and corrosion resistance can be enhanced.

Especially, when the protective film includes a triple-layer structure, any layer in the triple-layer structure having a type of crystalline structure different from that of adjacent layer thereto, a pinhole will be effectively filled in the interfaces of the three laminated layers (the protective layers 20A-20C). As a result, the compactness of the protective film 20 can be more improved. Therefore, corrosion resistance can be enhanced more.

Further, when the protective film 20B has a cloumnar-crystalline structure, the protective layer 20A with the average crystal grain diameter of 0.5 micrometer or less can enhance the above-described effect much more.

According to the present embodiment as shown in FIG. 2, the protective film 20 is constituted of three layers; the protective layer 20A with a crystalline structure α, the protective layer 20B with a crystalline structure β, and the protective layer 20C with the crystalline structure α are layered in this order from the side near the magnet body 10. However, the configuration is not necessarily limited to this, and the laminated configuration of a protective film provided on the magnet body 10 can be freely set up, as long as the protective film includes three or more layers each having a type of crystalline structure, and there exists two or more types of crystalline structures in the protective film in all, as described above. For example, the protective film may have a series of other types of multilayers and there may exist the two types of crystalline structures α, β (reference to FIGS. 5-11, FIG. 13, and FIG. 14), or three types of crystalline structures α to γ (reference to FIG. 12) in the protective film in all. In this case, in consideration of the improvement of corrosion resistance much more especially, as shown in FIGS. 5-7 and FIGS. 10, 11 and 14, any of the layers in the protective film preferably has a type of crystalline structure different from that of adjacent layer thereof.

Second Embodiment

Next, a second embodiment of the present invention will be described.

Figure 5:
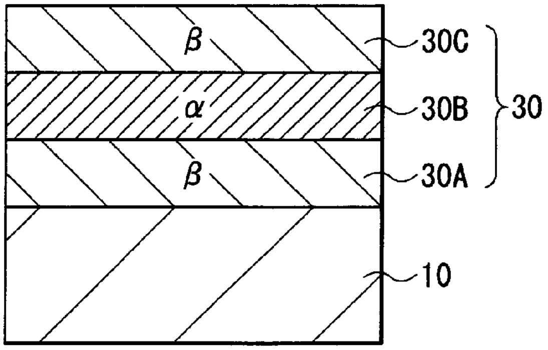
FIG. 5 is a schematical cross-sectional view showing a sectional configuration of a main part of a rare-earth magnet according to a second embodiment of the present invention.

FIG. 5 shows a configuration of a rare-earth magnet according to the present embodiment, which corresponds to the sectional configuration shown in FIG. 2. The rare-earth magnet has the same configuration as that of the rare-earth magnet (reference to FIG. 1) described in the foregoing first embodiment except that the rare-earth magnet is provided with a protective film 30 instead of the protective film 20 as shown in FIG. 5.

The protective film 30 wherein the protective film includes three or more layers each having a type of crystalline structure, and there exists two or more types of crystalline structures in the protective film in all, and has other laminated configuration than as already explained in the above-mentioned first embodiment (reference to FIG. 2). One example of the protective film 30 has three layers; a protective layer 30A with a crystalline structure β, a protective layer 30B with a crystalline structure α, and a protective layer 30C with the crystalline structure β are layered in this order from the side near a magnet body 10, as shown in FIG. 5. The other configurations of the protective layers 30A-30C than those described above (for example, types, component materials, average crystal grain diameters, etc. of the crystalline structures) are the same as the configurations of the protective layers 20A-20C having a corresponding crystalline structure. Namely, herein, the configuration of the protective layers 30A, 30C with a crystalline structure β corresponds to that of the protective layer 20B with the similar crystalline structure β, and the configuration of the protective layer 30B with the crystalline structure α corresponds to that of the protective layers 20A, 20C with the similar crystalline structure α.

The rare-earth magnet can be manufactured by passing through the same procedure as the manufacturing method of the rare-earth magnet explained in the above-mentioned first embodiment except for providing the protective film 30 (the protective layers 30A-30C) on the magnet body 10 instead of the protective film 20.

Thus, according to the present embodiment, since the protective film 30 includes three or more layers (the protective layers 30A-30C) each having a type of crystalline structure, and there exists two or more types of crystalline structures (α and β) in the protective film 30 in all, corrosion of the protective film 30 can be restrained by the same operation as explained in the above-mentioned first embodiment. Therefore, corrosion resistance can be enhanced.

According to the present embodiment, as shown in FIG. 5, the protective film 30 is constituted in such a manner as includes three layers; the protective layer 30A with the crystalline structure β, the protective layer 30B with the crystalline structure α, and the protective layer 30C with the crystalline structure β are layered in this order from the side near the magnet body 10. However, it is not necessarily limited to this, and the laminated configuration of the protective film 30 can be freely set up, as long as the protective film 30 includes three or more layers each having a type of crystalline structure, and there exists two or more types of crystalline structures in the protective film 30 in all, as described above.

Figure 6:
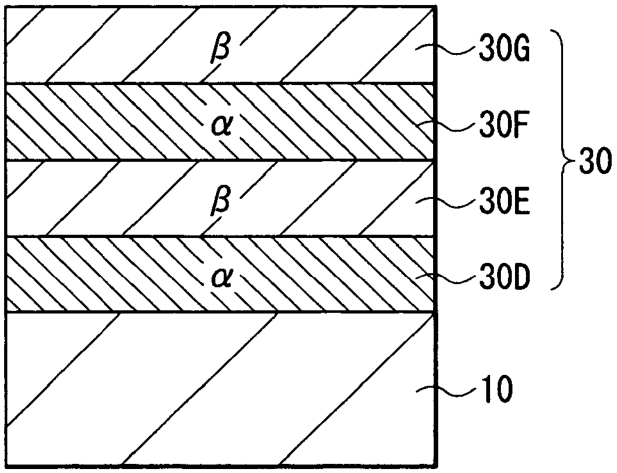
FIG. 6 is a cross-sectional view showing a modification of the configuration of the rare-earth magnet according to the second embodiment of the present invention.
Figure 7:
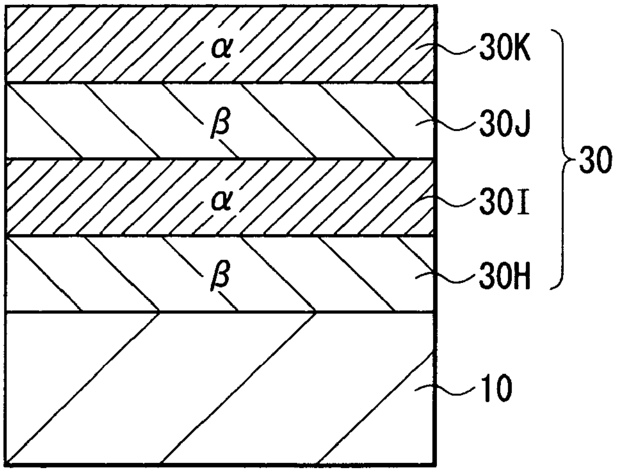
FIG. 7 is a cross-sectional view showing another modification of the configuration of the rare-earth magnet according to the second embodiment of the present invention.

For example, if the protective film 30 may be constituted of four layers. Specifically, in order to make any of the layers in the protective film have a type of crystalline structure different from that of adjacent layer thereto using the above-described two types of crystalline structures α, β for example, what is necessary is just to stack the arbitrary number of pairs of a layer with the crystalline structure α and a layer with the crystalline structure β. More specifically, as shown in FIG. 6, a protective layer 30D with the crystalline structure α, a protective layer 30E with the crystalline structure β, a protective layer 30F with the crystalline structure α, and a protective layer 30G with the crystalline structure β may be layered in this order from the side near the magnet body 10. As shown in FIG. 7, a protective layer 30H with the crystalline structure β, a protective layer 30I with the crystalline structure α, a protective layer 30J with the crystalline structure β, and a protective layer 30K with the crystalline structure α may be layered in this order from the side near the magnet body 10. In the above cases, too, effects similar to those of the foregoing embodiment can be obtained.

Figure 8:
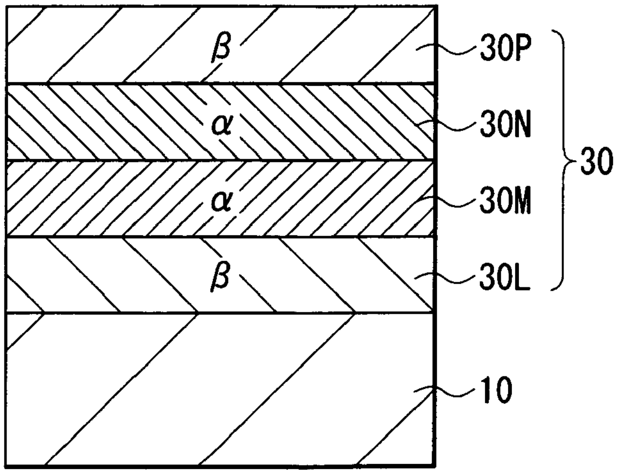
FIG. 8 is a cross-sectional view showing still another modification of the configuration of the rare-earth magnet according to the second embodiment of the present invention.

Besides, in order to make any of the layers in the protective film have a type of crystalline structure different from that of adjacent layer thereto using the above-described two types of crystalline structures α, β for example, layers with the crystalline structure α and layers with the crystalline structure β do not have to be laminated alternately. Specifically, as shown in FIG. 8, a protective layer 30L with the crystalline structure β, a protective layer 30M with the crystalline structure α, a protective layer 30N with the crystalline structure α and a protective layer 30P with the crystalline structure β may be layered in this order from the side near magnet body 10. Also in the case, effects similar to those of the foregoing embodiment can be obtained.

Of course, the protective film 30 is not limited to the above-mentioned three-layered or four-layered film, but may be a multiple layer constituted of five layers or more.

Third Embodiment

Next, a third embodiment of the present invention will be described.

Figure 9:
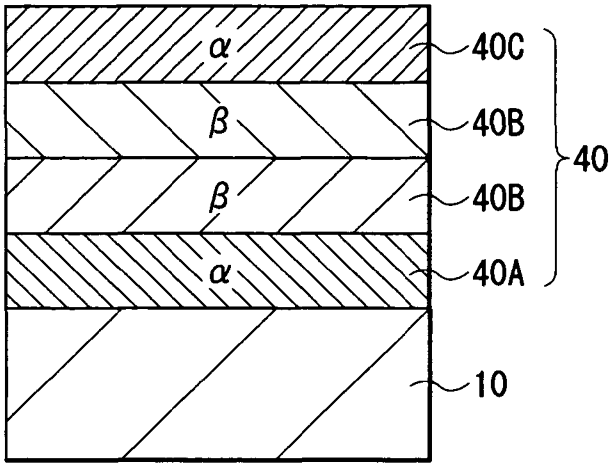
FIG. 9 is a cross-sectional view schematically showing a sectional configuration of a main part of a rare-earth magnet according to a third embodiment of the present invention.

FIG. 9 shows a configuration of a rare-earth magnet according to the present embodiment, and corresponds to the sectional configuration shown in FIG. 2. The rare-earth magnet has the same configuration as that of the rare-earth magnet explained in the above-mentioned first embodiment (reference to FIG. 1) except that a protective film 40 is provided instead of the protective film 20 as shown in FIG. 9.

The protective film 40 includes: a protective layer 40A (a first protective layer) with a polycrystalline structure, adjacent to the magnet body 10; a protective layer 40C (a second protective layer) with a polycrystalline structure, away from the magnet body 10; and a protective layer 40B (a third protective layer) with a columnar-structure disposed as an interlayer between the protective layers 40A and 40C. In addition, the protective film 40 has a different laminated configuration from as has been already explained in the above-mentioned first embodiment (reference to FIG. 2). Here, as shown in FIG. 9 for example, two protective layers 40B, 40B adjacent to each other are provided between the protective layers 40A and 40C. Namely, the protective film 40 is a four-layer film in which the protective layers 40A, 40B, 40B and 40C are layered in this order from the side near the magnet body 10, for example. The other configurations of the protective layers 40A-40C than those described above (for example, types, component materials, average crystal grain diameters, etc. of the crystalline structures) are the same as the configurations of the protective layers 20A-20C having a corresponding crystalline structure. Namely, herein, the configuration of the protective layers 40A, 40C with the crystalline structure α corresponds to that of the protective layers 20A, 20C with the similar crystalline structure α, and the configuration of the protective layers 40B with the crystalline structure β corresponds to that of the protective layer 20B with the similar crystalline structure β.

The rare-earth magnet can be manufactured by passing through the same procedure as the manufacturing method of the rare-earth magnet explained in the above-mentioned first embodiment except for providing the protective film 40 (the protective layers 40A-40C) on the magnet body 10 instead of the protective film 20.

Thus, according to the present embodiment, since the protective film 40 includes: the protective layer 40A with a polycrystalline structure, adjacent to the magnet body 10; the protective layer 40C with a polycrystalline structure, away from the magnet body 10; and the two protective layers 40B with a columnar-crystalline structure, disposed between the protective layers 40A and 40C, spread of corrosion materials from the outside can be restrained in the grain boundary with the operation explained in the above-mentioned first embodiment. Therefore, corrosion resistance can be enhanced.

In the present embodiment, although the protective film 40 is constituted in such a manner that the two adjoining protective layers 40B are disposed between the protective layers 40A and 40C as shown in FIG. 9, but it is not necessarily limited to this, and the laminated configuration of the protective film 40 can be changed freely as long as one or more interlayers is disposed between the protective layers 40A and 40C, and the interlayers include the protective layer 40B with a columnar-crystalline structure. Specifically, for example, the number of the protective layers 40B provided between the protective layers 40A and 40C may be varied, or other layers may be collectively provided with the protective layer 40B between the protective layers 40A and 40C.

Figure 10:
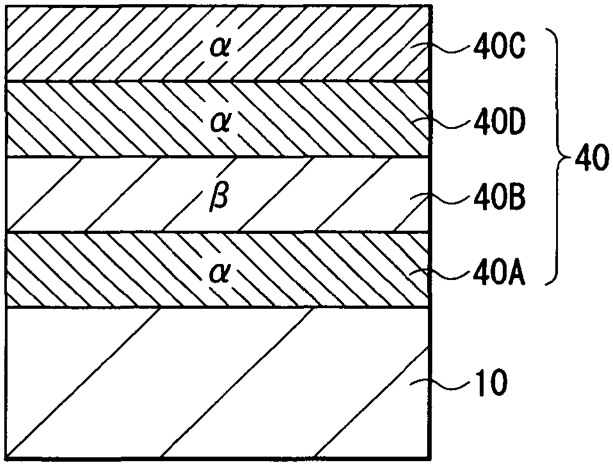
FIG. 10 is a cross-sectional view showing a modification of the configuration of the rare-earth magnet according to the third embodiment of the present invention.
Figure 11:
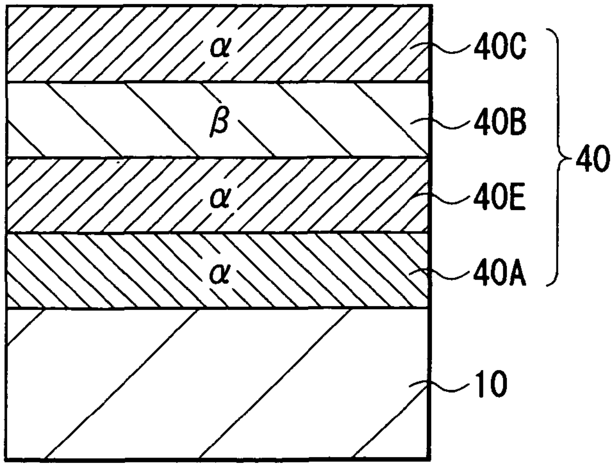
FIG. 11 is a cross-sectional view showing another modification of the configuration of the rare-earth magnet according to the third embodiment of the present invention.

As one example, in the case of making a four-layer protective film 40, the protective film 40 may be constituted in such a manner that a single protective layer 40B is provided between the protective layers 40A and 40C and a single protective layer 40D with a polycrystalline structure is further provided between the protective layers 40B and 40C as shown in FIG. 10. Namely, the protective layers 40A, 40B, 40D and 40C may be layered in this order from the side near the magnet body 10. Or, as shown in FIG. 11, the protective film 40 may be constituted in such a manner that a single protective layer 40B is provided between the protective layers 40A and 40C and a single protective layer 40E with a polycrystalline structure is provided between the protective layers 40A and 40B. Namely, the protective layers 40A, 40E, 40B and 40C may be layered in this order from the side near the magnet body 10. With such configurations, effects similar to those of the foregoing embodiment can be obtained.

Figure 12:
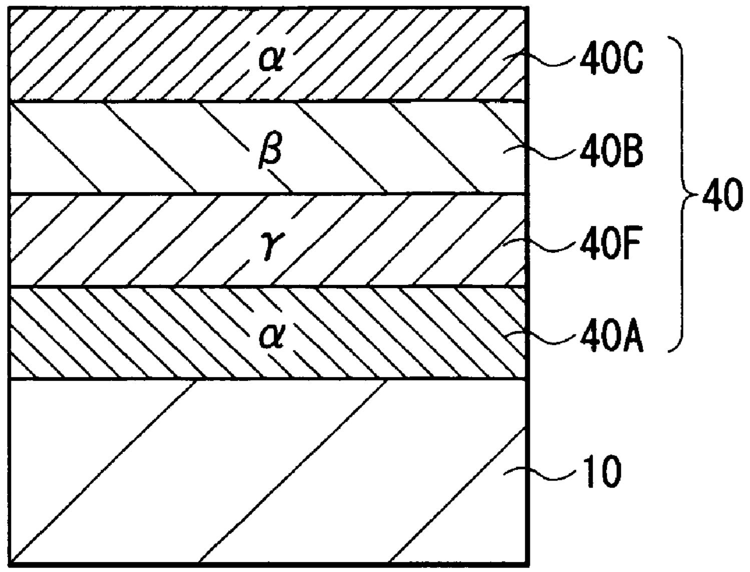
FIG. 12 is a cross-sectional view showing still another modification of the configuration of the rare-earth magnet according to the third embodiment of the present invention.

Especially in a case of making a four-layer protective film 40, a single protective layer 40B (a third protective layer) with a crystalline structure β is provided between the protective layers 40A (a first protective layer) and 40C (a second protective layer) having a crystalline structure α, and a single protective layer 40F (a fourth protective layer) with a crystalline structure γ that is different from the crystalline structures α, β is provided between the protective layers 40A and 40B as shown in FIG. 12. Namely, protective layers 40A, 40F, 40B and 40C may be layered in this order from the side near the magnet body 10. One example of the crystalline structure γ is assumed to be in a mixed state of the polycrystalline structure α nd the columnar-crystalline structure; specifically, similar to the columnar-crystalline structure. Average crystal grain diameter of the crystalline structure γ is smaller than that of a normal columnar-crystalline structure. Thereby, the average crystal grain diameter of the protective layer 40F is larger than that of the protective layer 40A, and smaller than that in the major-axis direction in the protective layer 40B. With such configuration, too, effects similar to those of the foregoing embodiment can be obtained.

Figure 13:
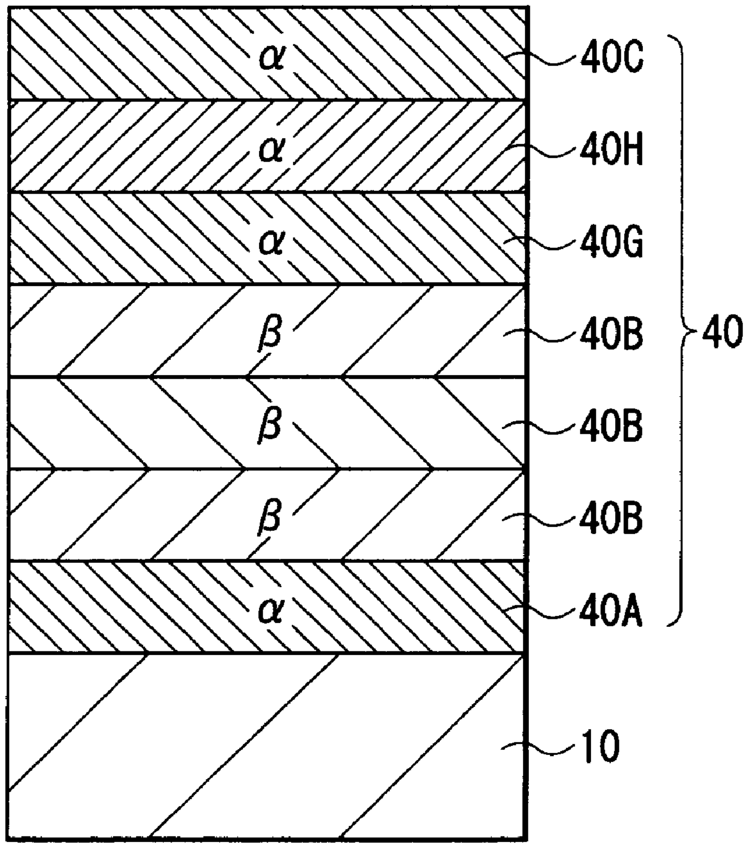
FIG. 13 is a cross-sectional view showing a further modification of the configuration of the rare-earth magnet according to the third embodiment of the present invention.
Figure 14:
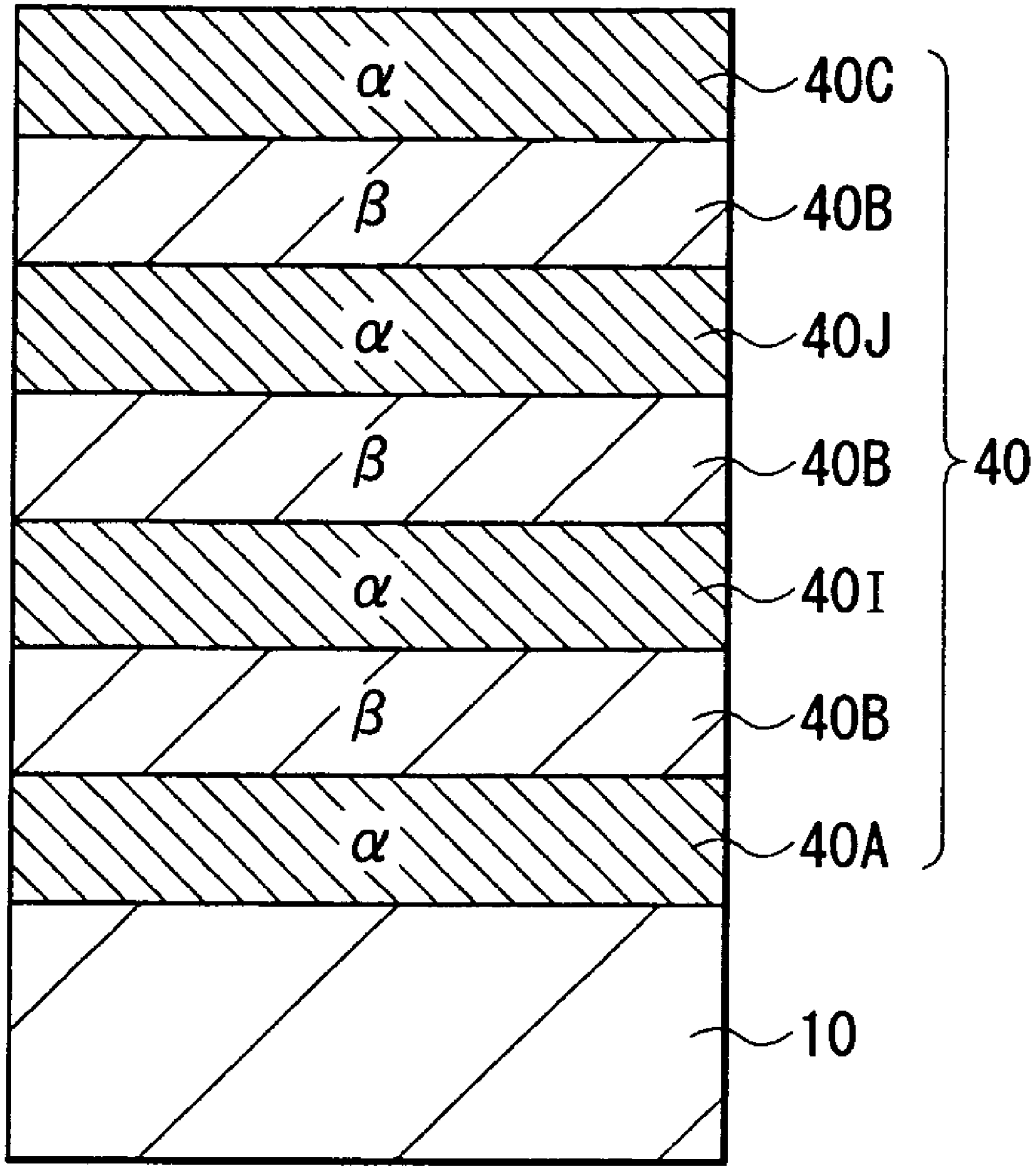
FIG. 14 is a cross-sectional view showing a still further modification of the configuration of the rare-earth magnet according to the third embodiment of the present invention.

As another example, the protective film 40 may be constituted as a seven-layer multilayer film. In this case, as shown in FIG. 13, the protective film 40 may be constituted in such a manner that the three adjoining protective layers 40B are provided between the protective layers 40A and 40C, and protective layers 40G and 40H with a polycrystalline structure are provided between the protective layers 40B and 40C. Thereby, the protective layers 40A, 40B, 40B, 40B, 40G, 40H and 40C may be layered in this order from the side near the magnet body 10. Or, as shown in FIG. 14, the protective film 40 may be constituted in such a manner that three protective layers 40B are provided between the protective films 40A and 40C so that the protective layers 40B may exist apart from each other, and protective layers 40I, 40J with a polycrystalline structure are provided among the protective layers 40B. Namely, the protective layers 40A, 40B, 40I, 40B, 40J, 40B and 40C may be layered in this order from the side near the magnet body 10. It is to be confirmed that the number of the protective layers 40B shown in FIGS. 13, 14 may be not limited to three, but four or more may be of course permissible. In the case where the protective film 40 appearing in FIG. 14 has four or more protective layers 40B therein, it goes without saying that the number of layers with a polycrystalline structure which are to be provided between the protective layers 40B is also increased to three or more. Also with such configuration, effects similar to those of the foregoing embodiment can be obtained.

Of course, the protective film 40 is not limited to the above-mentioned four or seven layers, but may be a multilayer film including any arbitrary number of layers as far as four layers or more.

EXAMPLE

Hereinbelow will be explained an detailed example of the present invention.

Example 1

A rare-earth magnet provided with a protective film 20 explained with reference to FIG. 2 in the above-mentioned first embodiment was manufactured by passing through the following procedures. First, a Nd—Fe—B sintered body (i.e. compact) fabricated via powder metallurgy process went through a heat treatment at 600 degrees Celsius in an argon atmosphere for two hours, then sized to dimensions of 56 mm*40 mm*8 mm. Thereafter, it was polished by barrel polishing process for edging. Thus, a magnet body 10 was obtained. Subsequently, a surface of the magnet body 10 was washed in an alkaline degreasing liquid and activated with a nitric acid solution, then carefully washed with water.

Subsequently, a protective layer 20A and a protective layer 20B made of nickel-plating layers were formed on the surface of the magnet body 10 by electroplating using a Watts bath that contains a semi-gloss additive. At that time, current density was adjusted so as to exceed 0.7 A/dm$^2$ at first (when the protective layer 20A was formed), and then re-adjusted to 0.3 A/dm$^2$ (when the protective layer 20B was formed). Finally, the protective layer 20C made of a nickel-plating layer was formed by electroplating using a Watts bath that contains a gloss additive. At that time, current density was adjusted to be fixed at 0.3 A/dm$^2$. With the foregoing procedures, a rare-earth magnet of Example 1 provided with the protective film 20 (the protective layers 20A-20C) was obtained.

Example 2

By passing through the following procedures, a rare-earth magnet provided with a protective film 30 explained with reference to FIG. 8 in the above-mentioned second embodiment was manufactured. Namely, after preparing a magnet body 10 by passing through the same procedure as Example 1, a protective layer 30L made of a nickel-plating layer was formed on the surface of the magnet body 10 by electroplating using a Watts bath that contains a semi-gloss additive. Subsequently, a protective layer 30M made of a nickel-plating layer was formed over the protective layer 30L by pulse metal plating using the same Watts bath as used previously. At that time, current density was adjusted to 0.3 A/dm$^2$ when current was applied, and adjusted to 0 A/dm$^2$ when current was not applied, and current application time was adjusted to 50 ms. Subsequently, a protective layer 30N made of a nickel-sulfur alloy-plating layer was formed over the protective layer 30M by electroplating using a Watts bath that contains an organosulfur compound brightener (100 mg/L). Finally, a protective layer 30P made of a nickel-plating layer was formed over the protective layer 30N by electroplating using a Watts bath that contains a semi-gloss additive. In those cases throughout the all foregoing electroplatings except the pulse metal plating, adjustment was made so that the current density was fixed to 0.3 A/dm$^2$. In this manner, a rare-earth magnet of Example 2 provided with the protective film 30 (the protective layers 30L, 30M, 30N and 30P) was obtained.

Example 3

By passing through the following procedures, a rare-earth magnet provided with a protective film 40 explained with reference to FIG. 10 in the above-mentioned third embodiment was manufactured. First, after preparing a magnet body 10 by passing through the same procedure as Example 1, a protective layer 40A made of a nickel-sulfur alloy-plating layer was formed on the surface of the magnet body 10 by electroplating using a Watts bath that contains an organosulfur compound brightener (100 mg/L). Subsequently, a protective layer 40B made of a nickel-plating layer was formed over the protective layer 40A by electroplating using a Watts bath that contains a semi-gloss additive. Subsequently, a protective layer 40D made of a nickel-plating film was formed over the protective layer 40B by electroplating using a Watts bath that contains a gloss additive. Finally, a protective layer 40C made of a nickel-tungsten alloy-plating layer was formed over the protective layer 40D by electroplating using a Watts bath that contains sodium tungstate (0.3 mol/L). At that time, current density was adjusted so to be fixed to 0.3 A/dm$^2$ throughout the procedures as described above. In this manner, a rare-earth magnet of Example 3 provided with the protective film 40 (the protective layers 40A, 40B, 40D and 40C) was obtained.

Example 4

By passing through the following procedures, a rare-earth magnet provided with a protective film 40 explained with reference to FIG. 12 according to the above-mentioned third embodiment was manufactured. First, after preparing a magnet body 10 by passing through the same procedure as Example 1, a protective layer 40A made of a nickel-sulfur alloy-plating layer was formed on the surface of the magnet body 10 by electroplating using a Watts bath that contains an organosulfur compound (saccharin) (100 mg/L). Subsequently, a protective layer 40F made of a nickel-plating layer was formed over the protective layer 40A by electroplating using a Watts bath that contains a semi-gloss additive (coumarin). Subsequently, a protective layer 40B made of a nickel-plating layer was formed over the protective layer 40F by electroplating using a Watts bath that contains a semi-gloss additive (2-butyne-1,4-diol). Finally, a protective layer 40C made of a nickel-plating film was formed by electroplating using a Watts bath that contains a gloss additive. At that time, current density was adjusted so to be fixed to 0.3 A/dm$^2$ throughout the foregoing procedures. In this manner, a rare-earth magnet of Example 4 provided with the protective film 40 (the protective layers 40A, 40F, 40B and 40C) was obtained.

Comparative Example

After preparing a magnet body 10 by passing through the same procedure as Example 1, a protective layer made of a nickel-plating layer was formed over the magnet body 10 by electroplating using a Watts bath that contains a semi-gloss additive, then another protective layer made of a nickel-plating layer was successively formed over the obtained protective layer by electroplating using a Watts bath that contains a gloss additive. At that time, current density was adjusted so to be fixed to 0.3 A/dm$^2$ throughout the procedures. In this manner, a rare-earth magnet of Comparative Example provided with a two-layer protective film was obtained.

(Evaluation)

Figure 15:
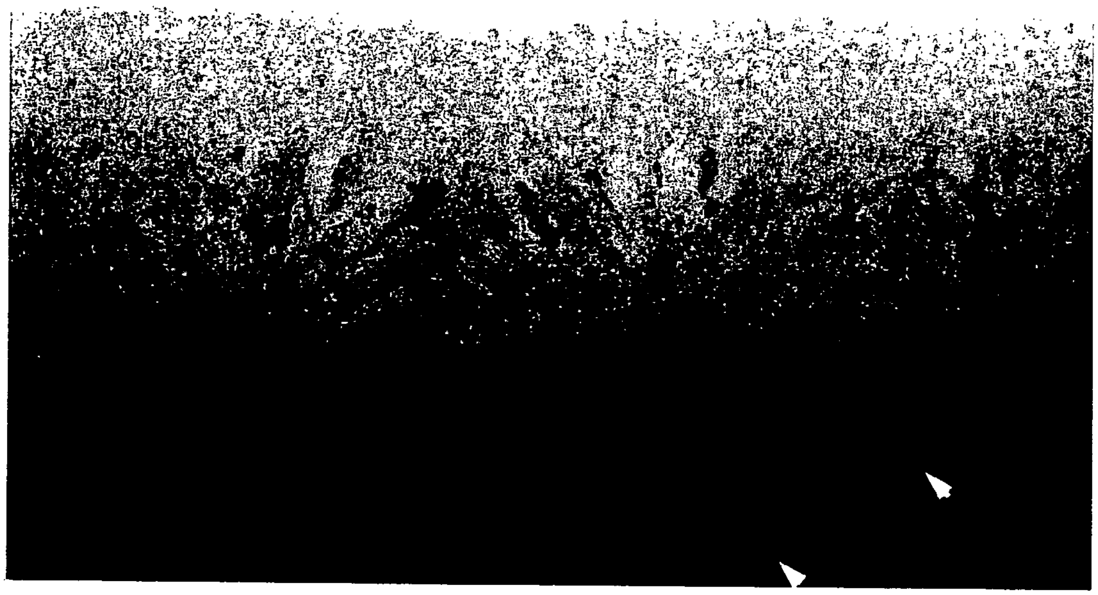
FIG. 15 shows an SIM picture representing a cross sectional structure of the rare-earth magnet of Example 1.

First, SIM images of the rare-earth magnets of Example 1 and Comparative Example were prepared using FIB system in order to observe the cross sections thereof. FIG. 15 shows a SIM image of Example 1. As shown in FIG. 15, it is confirmed that the rare-earth magnet of Example 1 includes the protective layer 20A with a polycrystalline structure, the protective layer 20B with a columnar-crystalline structure, and the protective layer 20C with a polycrystalline structure layered in this order on the surface of the magnet body 10. The average crystal grain diameter of the protective layer 20A was 0.5 micrometer or less, and its thickness was of the order of 2 micrometers. The average crystal grain diameter of the protective layer 20B in the major-axis direction was 5 micrometers and that in the minor-axis direction was 1 micrometer, its thickness was of the order of 5 micrometers. And the average crystal grain diameter of the protective layer 20C was 0.5 micrometer or less, and its thickness was of the order of 5 micrometers.

As to Comparative Example, though an SIM image is not shown here, a protective layer with a columnar-crystalline structure and another protective layer with a polycrystalline structure were formed in this order over the magnet body 10. The average crystal grain diameter of the protective layer with the columnar-crystalline structure in the major-axis direction was 5 micrometers and that in the minor-axis direction was 1 micrometer, and its thickness was of the order of 5 micrometers. The average crystal grain diameter of the protective layer with the polycrystalline structure was 0.5 micrometer or less, and its thickness was of the order of 5 micrometers.

Subsequently, corrosion resistance was evaluated about the rare-earth magnets of Examples 1-4 and Comparative Example through a high temperature and high humidity test that was conducted in a steam atmosphere, $0.2\times10^6$ Pa at 120 degrees Celsius for 100 hours, and through a salt spray test specified by JIS-C-0023 for 24 hours. Appearances were inspected with the naked eye and results were determined by the presence of rusting. Results are shown in Table 1.

TABLE 1

| | High Temperature and High Humidity Test | Salt Spray Test |
|---|---|---|
| Example 1 | Passed | Passed |
| Example 2 | Passed | Passed |
| Example 3 | Passed | Passed |
| Example 4 | Passed | Passed |
| Comparative Example | Passed | Rejected |

As shown in Table 1, the rare-earth magnets according to Examples 1-4 passed both of the high temperature and high humidity test and the salt spray test. According to Comparative Example, in contrast, corrosion was seen in the salt spray test. Namely, it has become clear that an excellent corrosion resistance can be acquired when a protective film includes three or more layers each having a type of crystalline structure, and there exists two or more types of crystalline structures in the protective film in all.

As mentioned above, some embodiments and examples were given to describe the present invention, but it is to be noted that the present invention is not limited to the above-described embodiments or examples, and can be modified in various ways. For example, although the above-mentioned embodiments and examples explain a case of having a magnet body and a protective film, some other component elements other than these can be further given. For example, some other sorts of films may be provided between a magnet body and a protective film, or may be provided over the protective film.

Especially, in the above-mentioned first embodiment are used two types of crystalline structures (the polycrystalline structure and the columnar-crystalline structure) in order to vary the adjoining crystalline structures mutually in the protective film that is formed into a multilayer film with three or more layers. However, it is not necessarily limited to this, and the types or the number of the types of the crystalline structures can be freely changed, as long as there surely exists two or more types of crystalline structures. Examples of other types of crystalline structures available besides the above-mentioned polycrystalline structure and the columnar-crystalline structure include five types of crystalline structures (FI-type, BR-type, Z-type, FT-type and UD-type) described in Electrochimica Acta, Vol. 39, No. 8/9, pp. 1091-1105, 1994. In the case where such other types of crystalline structures as described above are used, effects similar to foregoing first embodiment can also be obtained.

The rare-earth magnet of the present invention can be suitable applied to a motor for electric vehicles, a motor for hybrid vehicles, a motor for robots, a motor for hard disk loudspeaker voice coils, a motor for optical pickups, a spindle motor and the like.

Obviously many modifications and variations of the present invention are possible in the light of the above teachings. It is therefore to be understood that within the scope of the appended claims the invention may be practiced otherwise than as specifically described.

What is claimed is:

1. A rare-earth magnet comprising:

a magnet body constituted of a sintered magnet containing a transition metal element and a rare earth element; and a protective film covering a surface of the magnet body;

wherein the protective film includes a four-layered structure composed of a first protective layer, a second protective layer, a third protective layer and a fourth protective layer, the first protective layer having a polycrystalline structure and being adjacent to the magnet body, the second protective layer having a polycrystalline structure and being away from the magnet body, the third protective layer having a columnar-crystalline structure grown in a radial pattern which is interposed between the first protective layer and the second protective layer and being adjacent to the first protective layer, and the fourth protective layer having a columnar-crystalline structure grown in a radial pattern which is interposed between the second protective layer and the third protective layer and being adjacent to the second protective layer and the third protective layer.

2. The rare-earth magnet according to claim 1, wherein an average crystal grain diameter in the first protective layer and an average crystal grain diameter in the second protective layer are smaller than that in a major-axis direction in the third protective layer, and an average crystal grain diameter of the fourth protective layer is larger than that of the first protective layer and smaller than that in the major-axis direction in the third protective layer.

3. The rare-earth magnet according to claim 1, wherein the protective film is a metal plating film.

4. A rare-earth magnet according to claim 1, wherein the third and fourth protective layers are separate layers.

5. The rare-earth magnet according to claim 4, wherein the third and fourth protective layers are made of different materials.

* * * * *